(12) United States Patent
Hsu et al.

(10) Patent No.: US 11,579,662 B2
(45) Date of Patent: Feb. 14, 2023

(54) HINGE WITH DOUBLE SYNCHRONOUSLY ROTATABLE AXLES

(71) Applicant: FOSITEK CORPORATION, New Taipei (TW)

(72) Inventors: An-Szu Hsu, New Taipei (TW); Chun-Han Lin, New Taipei (TW); Yung-Chih Tseng, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 209 days.

(21) Appl. No.: 17/217,302

(22) Filed: Mar. 30, 2021

(65) Prior Publication Data

US 2022/0221912 A1    Jul. 14, 2022

(30) Foreign Application Priority Data

Jan. 12, 2021 (TW) .................................. 110101062

(51) Int. Cl.
*G06F 1/16* (2006.01)
*E05D 3/18* (2006.01)
*E05D 3/12* (2006.01)

(52) U.S. Cl.
CPC ............ *G06F 1/1681* (2013.01); *E05D 3/122* (2013.01); *E05D 3/18* (2013.01); *E05Y 2201/11* (2013.01); *E05Y 2900/606* (2013.01); *G06F 1/1616* (2013.01)

(58) Field of Classification Search
CPC .... G06F 1/1681; G06F 1/1652; G06F 1/1616; E05Y 2201/11; E05Y 2900/606; E05D 3/122; E05D 3/18; F16C 11/04; H04M 1/022
See application file for complete search history.

(56) References Cited

U.S. PATENT DOCUMENTS

| | | | | |
|---|---|---|---|---|
| 10,303,223 B2 * | 5/2019 | Park | ..................... | G06F 1/1681 |
| 10,352,354 B1 * | 7/2019 | Hsu | ..................... | G06F 1/1641 |
| 10,401,917 B1 * | 9/2019 | Dai | ..................... | G06F 1/1681 |
| 10,480,225 B1 * | 11/2019 | Hsu | ..................... | E05D 3/12 |
| 10,545,541 B1 * | 1/2020 | Dighde | ................. | F16M 11/06 |
| 10,824,197 B1 * | 11/2020 | Hsu | ..................... | G06F 1/1641 |
| 10,845,850 B1 * | 11/2020 | Kang | ..................... | E05D 3/122 |
| 11,016,541 B2 * | 5/2021 | Lin | ..................... | E05D 3/122 |
| 11,194,366 B2 * | 12/2021 | Cheng | ................. | G06F 1/1652 |
| 11,301,006 B2 * | 4/2022 | Hsu | ..................... | G06F 1/1641 |
| 11,353,931 B2 * | 6/2022 | Hsu | ..................... | G06F 1/1681 |
| 11,359,425 B2 * | 6/2022 | Chang | ................. | G06F 1/1681 |
| 11,447,992 B2 * | 9/2022 | Wang | ................... | G06F 1/1681 |
| 2020/0291702 A1 * | 9/2020 | Hsu | ..................... | G06F 1/1681 |

(Continued)

*Primary Examiner* — Victor D Batson
*Assistant Examiner* — Matthew J Sullivan
(74) *Attorney, Agent, or Firm* — Birch, Stewart, Kolasch & Birch, LLP

(57) ABSTRACT

A hinge includes a base frame unit and two rotatable axle units. The base frame unit includes a base seat having two guideways and two shaft sliding slots. Each guideway includes an upright segment and an arcuate segment extending arcuately and laterally from an upper end of the upright segment. Each axle unit includes a hinge shaft rotatably extending through the shaft sliding slot, a rotary member fitted to the hinge shaft and having a guide key slidably engaged in the guideway, and a support bracket fitted to the hinge shaft to be connected to a casing part of an electronic device.

10 Claims, 14 Drawing Sheets

(56) References Cited

U.S. PATENT DOCUMENTS

| | | | | |
|---|---|---|---|---|
| 2020/0293094 | A1* | 9/2020 | Liu | H04M 1/0216 |
| 2021/0165466 | A1* | 6/2021 | Kang | H04M 1/022 |
| 2021/0195775 | A1* | 6/2021 | Zhao | E05D 3/122 |
| 2021/0207648 | A1* | 7/2021 | Chen | H04M 1/022 |
| 2021/0267076 | A1* | 8/2021 | Zhang | E05D 11/1014 |
| 2021/0325937 | A1* | 10/2021 | Siddiqui | G06F 1/1683 |
| 2022/0011827 | A1* | 1/2022 | Kim | G06F 1/1681 |
| 2022/0100238 | A1* | 3/2022 | Siddiqui | G06F 1/1681 |
| 2022/0100239 | A1* | 3/2022 | Siddiqui | G06F 1/1618 |
| 2022/0120124 | A1* | 4/2022 | Quynh | F16C 11/04 |
| 2022/0159109 | A1* | 5/2022 | Kang | H04M 1/022 |
| 2022/0179459 | A1* | 6/2022 | Wang | F16C 11/045 |
| 2022/0206543 | A1* | 6/2022 | Kim | G06F 1/1616 |
| 2022/0206544 | A1* | 6/2022 | Park | E05D 3/122 |
| 2022/0210937 | A1* | 6/2022 | Yun | H05K 5/0017 |
| 2022/0256721 | A1* | 8/2022 | Lin | H05K 5/0017 |

* cited by examiner

HINGE WITH DOUBLE SYNCHRONOUSLY ROTATABLE AXLES

CROSS-REFERENCE TO RELATED APPLICATION

This application claims priority of Taiwanese Patent Application No. 110101062, filed on Jan. 12, 2021.

FIELD

The disclosure relates to a hinge for an electronic device, and more particularly to a hinge with two double synchronously rotatable axles.

BACKGROUND

A conventional double-axle hinge has two rotatable axle units which are respectively connected with two casing parts of a foldable electronic device and synchronously rotatable to open and close the two casing parts. In design, a clearance between two casing parts exists in an opened state for preventing contact and collision of the casing parts during closing and opening operations. It is needed to improve the excess clearance thereof to prevent adverse influence on usage of the foldable electronic device.

SUMMARY

Therefore, an object of the disclosure is to provide a hinge that can alleviate at least one of the drawbacks of the prior art.

According to the disclosure, the hinge includes a base frame unit and two rotatable axle units. The base frame unit includes a base seat that has a first major surface to which an axial direction is normal, two guideways that are recessed from the first major surface and formed opposite to each other in a lateral direction which is transverse to the axial direction, and two shaft sliding slots each of which penetrates through the first major surface in the axial direction. Each of the guideways includes an upright segment which extends in an upright direction that is transverse to both the axial direction and the lateral direction and which has a lower end and an upper end, and an arcuate segment which extends arcuately and laterally from the upper end of the upright segment to terminate at a distal end. Each of the shaft sliding slots extends in the lateral direction and has an inner end and an outer end. The inner ends of the shaft sliding slots are proximate to each other and the outer ends of the shaft sliding slots are distal from each other in the lateral direction. The rotatable axle units rotatably extend through the base seat. Each of the rotatable axle units includes a hinge shaft which extends in the axial direction and through a respective one of the shaft sliding slots to have first and second shaft end portions that are respectively disposed at two opposite sides of the first major surface, a rotary member which is non-rotatably fitted to the first shaft end portion of the hinge shaft, and a support bracket which is non-rotatably fitted to the second shaft end portion of the hinge shaft and which extends outwardly and in the lateral direction to have a lateral end. The rotary member has a guide key which extends in the axial direction and which is slidably engaged in a respective one of the guideways. The rotatable axle units are rotatable relative to the base frame unit among an initial position, where the support brackets erect in the upright direction and the lateral ends are close to each other to be respectively located above the hinge shafts, the guide keys are respectively placed in the lower ends of the guideways, and the hinge shafts are respectively placed in the outer ends of the shaft sliding slots, a first stretched position, where the support brackets are placed horizontally and in the lateral direction and the lateral ends are remote from each other, the guide keys are respectively placed in the upper ends of the guideways, and the hinge shafts are respectively placed in the inner ends of the shaft sliding slots to be closer to each other, and a second stretched position, where the support brackets erect in the upright direction and the lateral ends are close to each other to be respectively located below the hinge shafts, the guide keys are respectively placed in the distal ends of the guideways, and the hinge shafts are respectively placed in the inner ends of the shaft sliding slots to be closer to each other.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
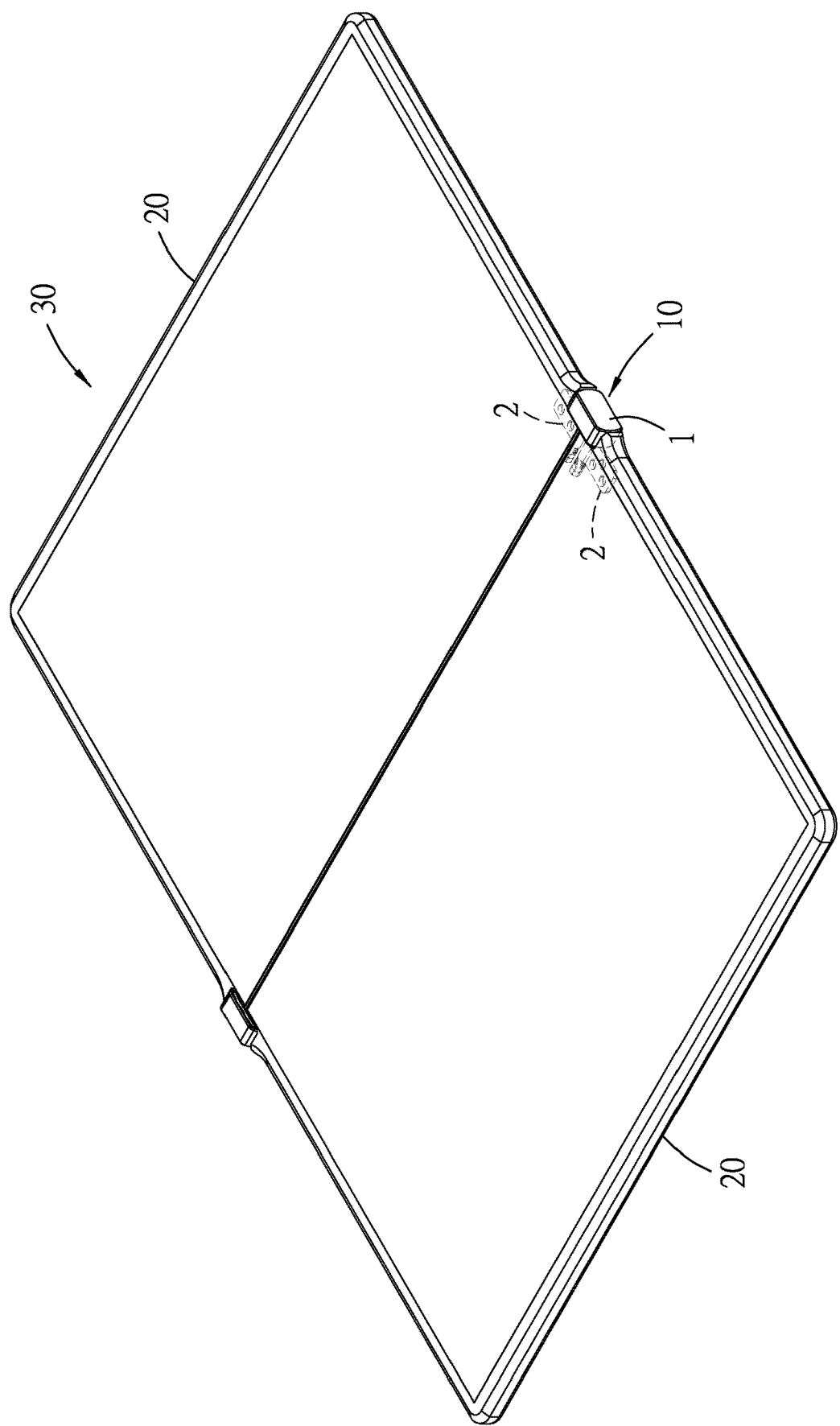
FIG. 1 is a perspective view illustrating an embodiment of a hinge according to the disclosure mounted on a foldable electronic device in an opened state.
Figure 2:
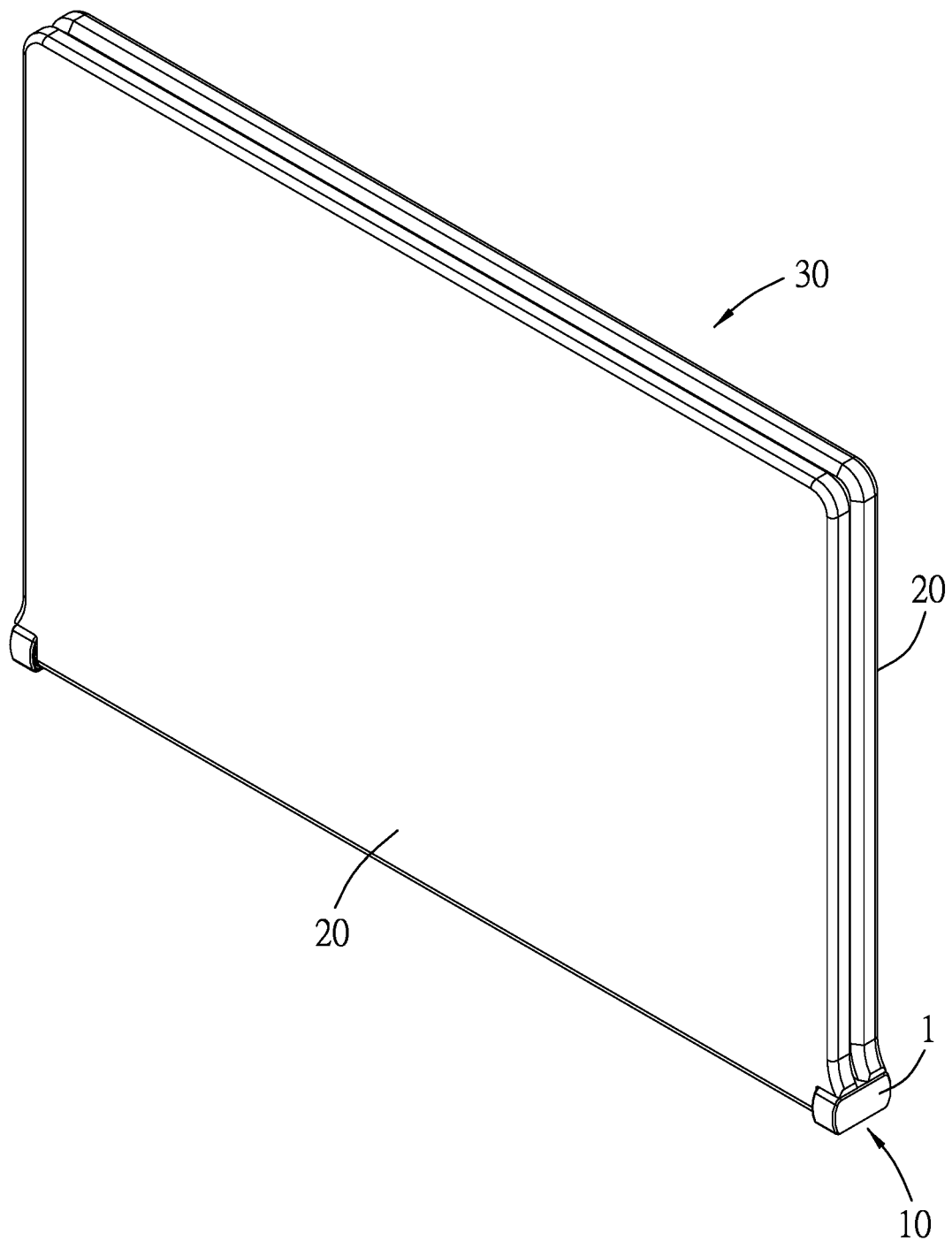
FIG. 2 is a perspective view illustrating the foldable electronic device in a closed state.
Figure 3:
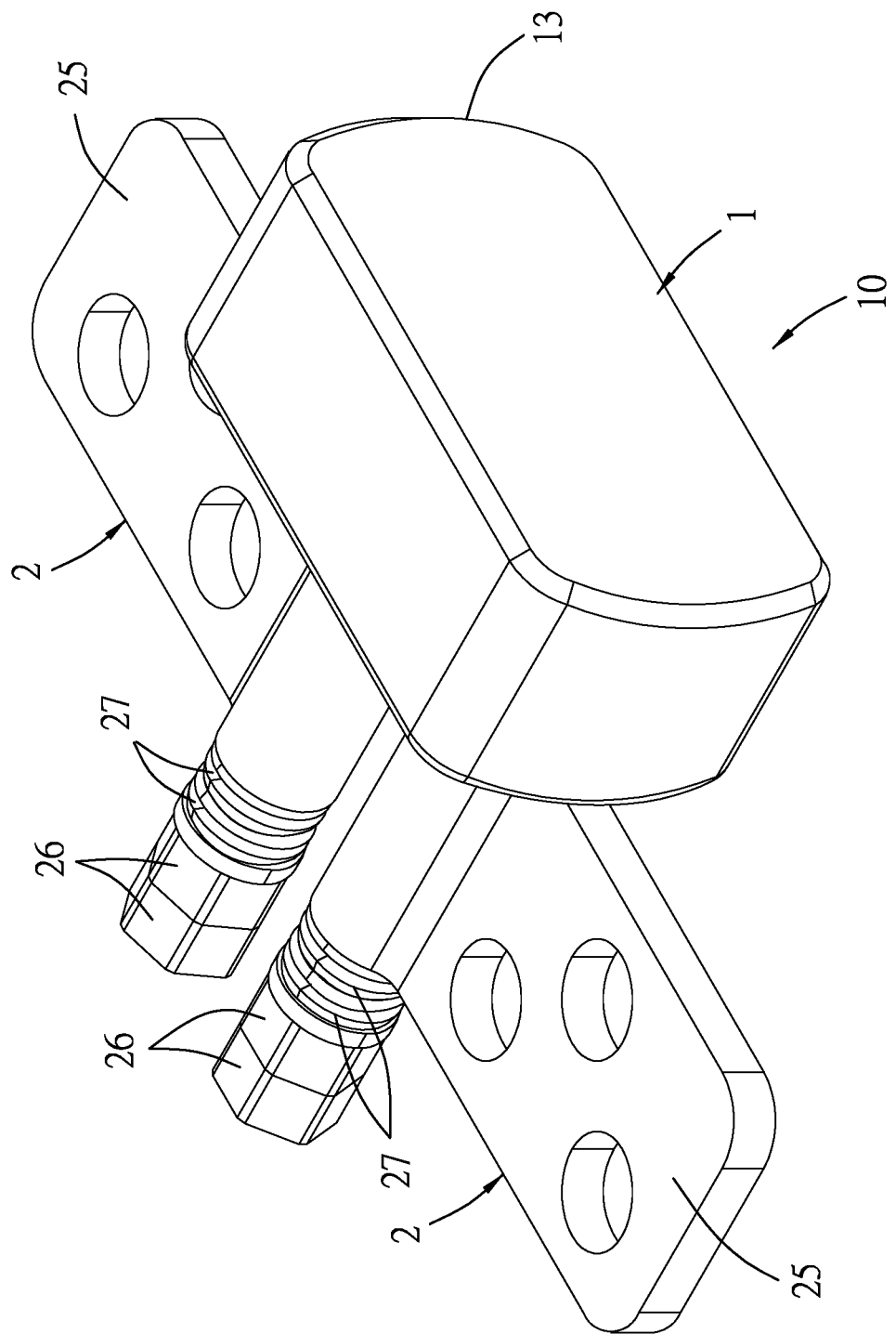
FIG. 3 is a perspective view of the embodiment.

Referring to FIGS. 1 to 3, an embodiment of a hinge 10 according to the disclosure is adapted to be mounted on two casing parts 20 of a foldable electronic device 30. The foldable electronic device 30 may be a foldable mobile phone, tablet, tablet PC, portable PC, etc. The hinge 10 of the embodiment includes a base frame unit 1 and two rotatable axle units 2.

With reference to FIGS. 4 to 7, the base frame unit 1 including a base seat 11, a synchronizing member 12 movably disposed on the base seat 11, and a protective cover 13 disposed on the base seat 11. The base seat 11 has a first major surface 111, a second major surface 112 opposite to the first major surface 111 in an axial direction, two guideways 113 which are recessed from the first major surface 111 and formed opposite to each other in a lateral direction that is transverse to the axial direction, two shaft sliding slots 114 each of which penetrates from the first major surface 111 to the second major surface 112, and two stabilizing slots 115 which are formed in the first major surface 111 and extend angularly to be communicated with the shaft sliding slots 114, respectively. The base seat 11 further has an accommodation chamber 116 which is recessed in the second major surface 112, and two fit slots 117 which are formed in the accommodation chamber 116.

Each of the guideways 113 includes an upright segment (113a) which extends in an upright direction that is transverse to both the axial direction and the lateral direction and which has a lower end (113a1) and an upper end (113a2), and an arcuate segment (113b) which extends arcuately and laterally from the upper end (113a2) of the upright segment (113a) to terminate at a distal end (113b1). Each of the shaft sliding slots 114 extends in the lateral direction, and has an inner end (114b) and an outer end (114a) opposite to each other. The inner ends (114b) of the shaft sliding slots 114 are proximate to each other and the outer ends (114a) of the shaft sliding slots 114 are distal from each other in the lateral direction. The stabilizing slots 115 are respectively communicated with the outer ends (114a) of the shaft sliding slots 114 and extend arcuately from the outer ends (114a).

The synchronizing member 12 is mounted on and movably engaged in the upright segments (113a) of the guideways 113, and has two engaging holes 121 opened laterally.

The protective cover 13 is fittingly mounted on an outer peripheral surface of the base seat 11 to cover and conceal the first major surface 111. The protective cover 13 has a base wall 131 facing the first major surface 111 of the base seat 11 in the axial direction, and a surrounding wall 132 extending from a periphery of the base wall 131 in the axial direction and mounted on the outer peripheral surface of the base seat 11. The base wall 131 is formed with two auxiliary guideways (131a) which are configured to respectively mate and be aligned with the guideways 113 in the axial direction, two auxiliary shaft slide slots (131b) which are configured to respectively mate and be aligned with the shaft sliding slots 114, and two auxiliary stabilizing slots (131c) which are configured to respectively mate and be aligned with the stabilizing slots 115. The guideways 113, the shaft sliding slots 114, the stabilizing slots 115, the fit slots 117, the auxiliary guideways (131a), the auxiliary shaft slide slots (131b) and the auxiliary stabilizing slots (131c) are mirror images of each other and are symmetric to each other with respect of an upright middle line of the base seat 11.

Figure 4:
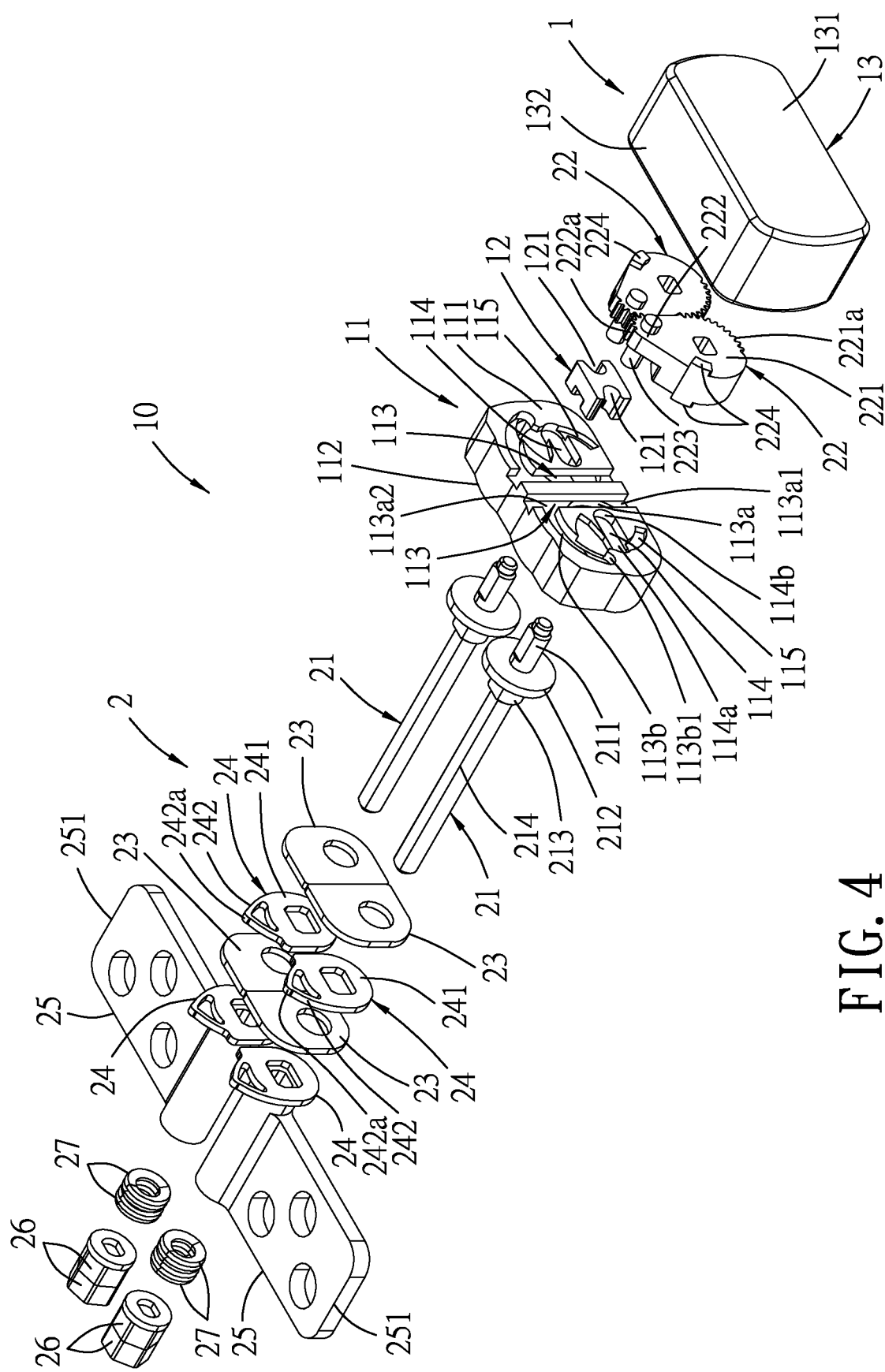
FIG. 4 is an exploded perspective view of the embodiment.
Figure 5:
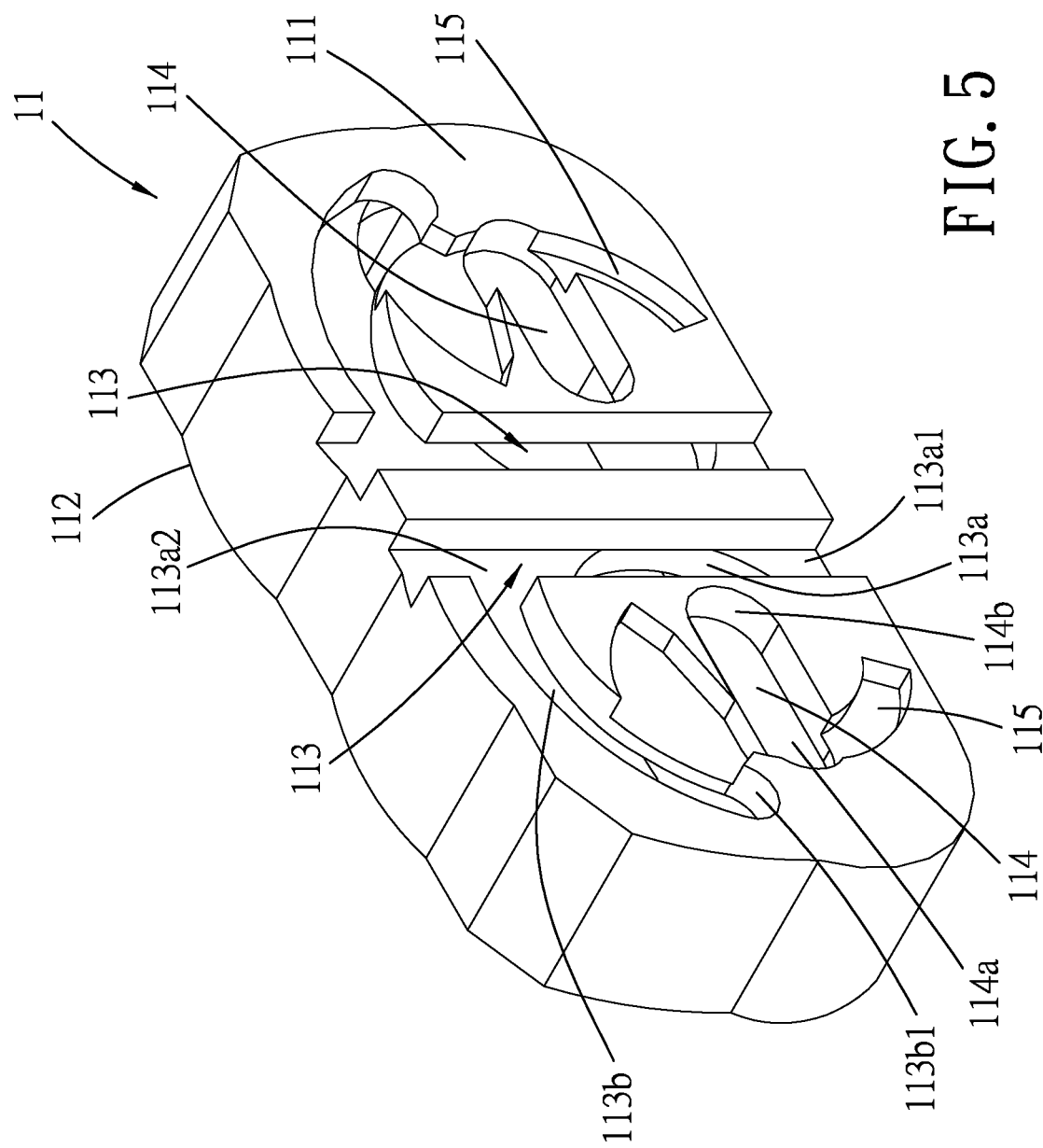
FIG. 5 is a perspective view of a base seat of a base frame unit of the embodiment.
Figure 6:
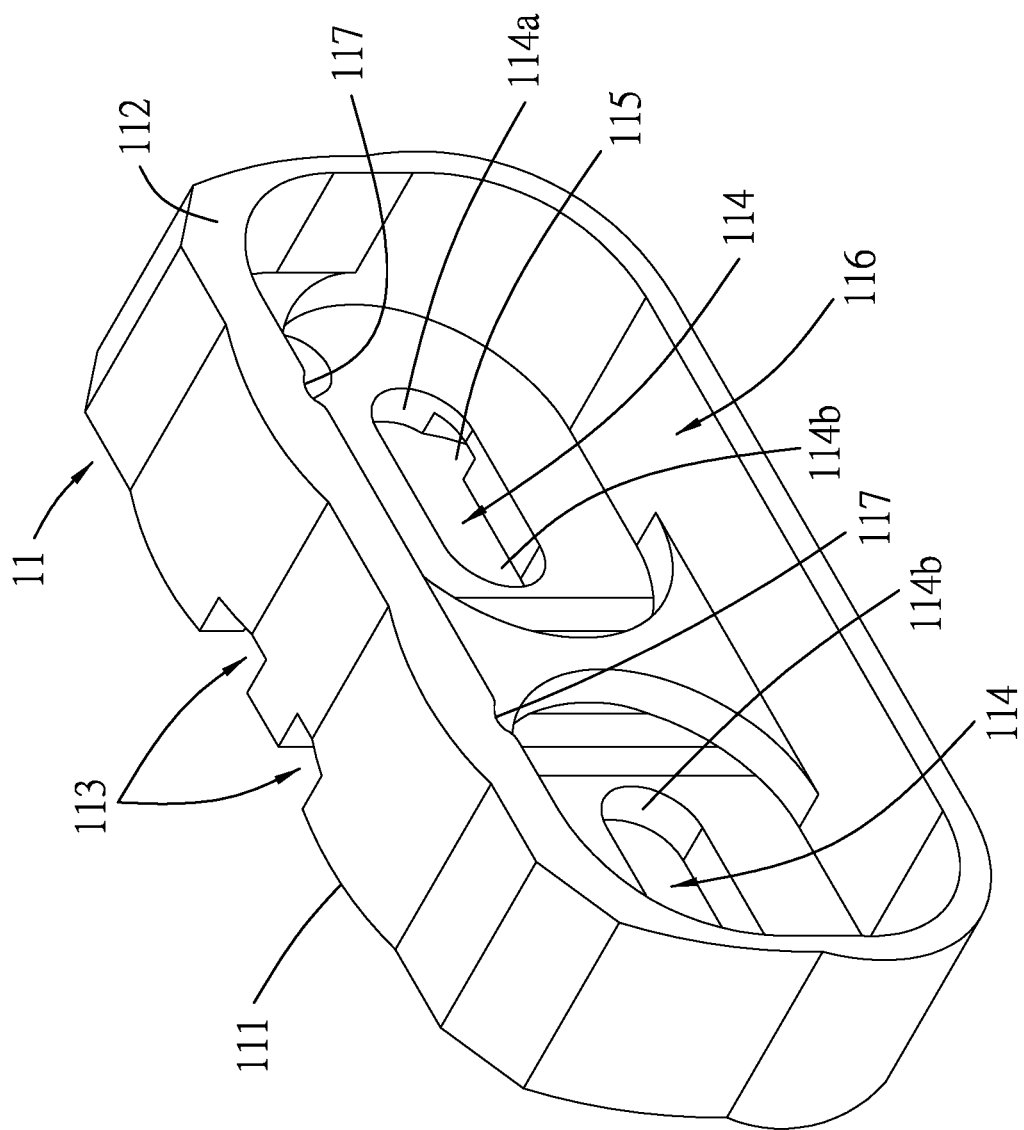
FIG. 6 is a perspective view of the base seat taken from another angle.
Figure 7:
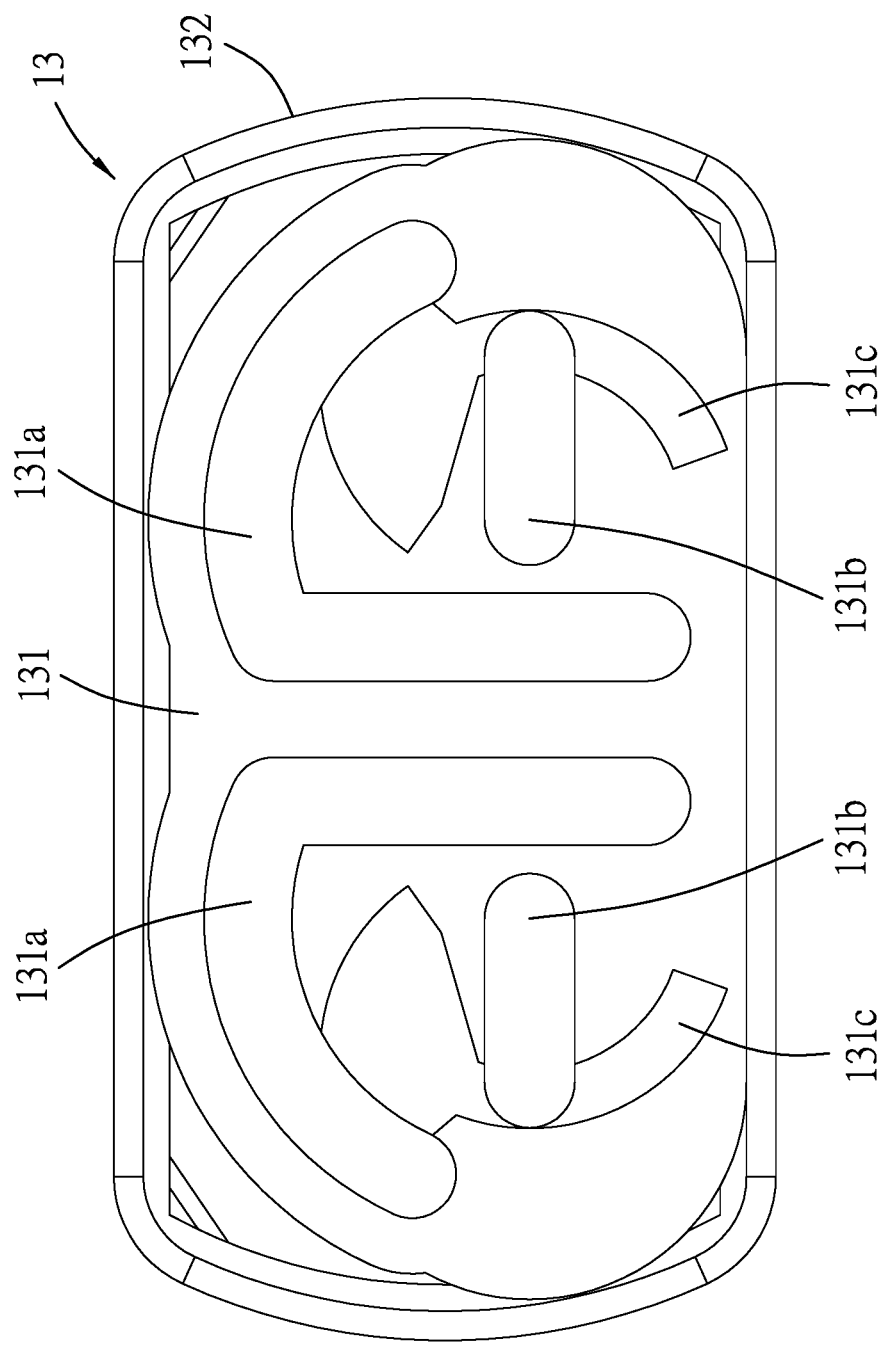
FIG. 7 is a rear view of a protective cover of the base frame unit of the embodiment.
Figure 8:
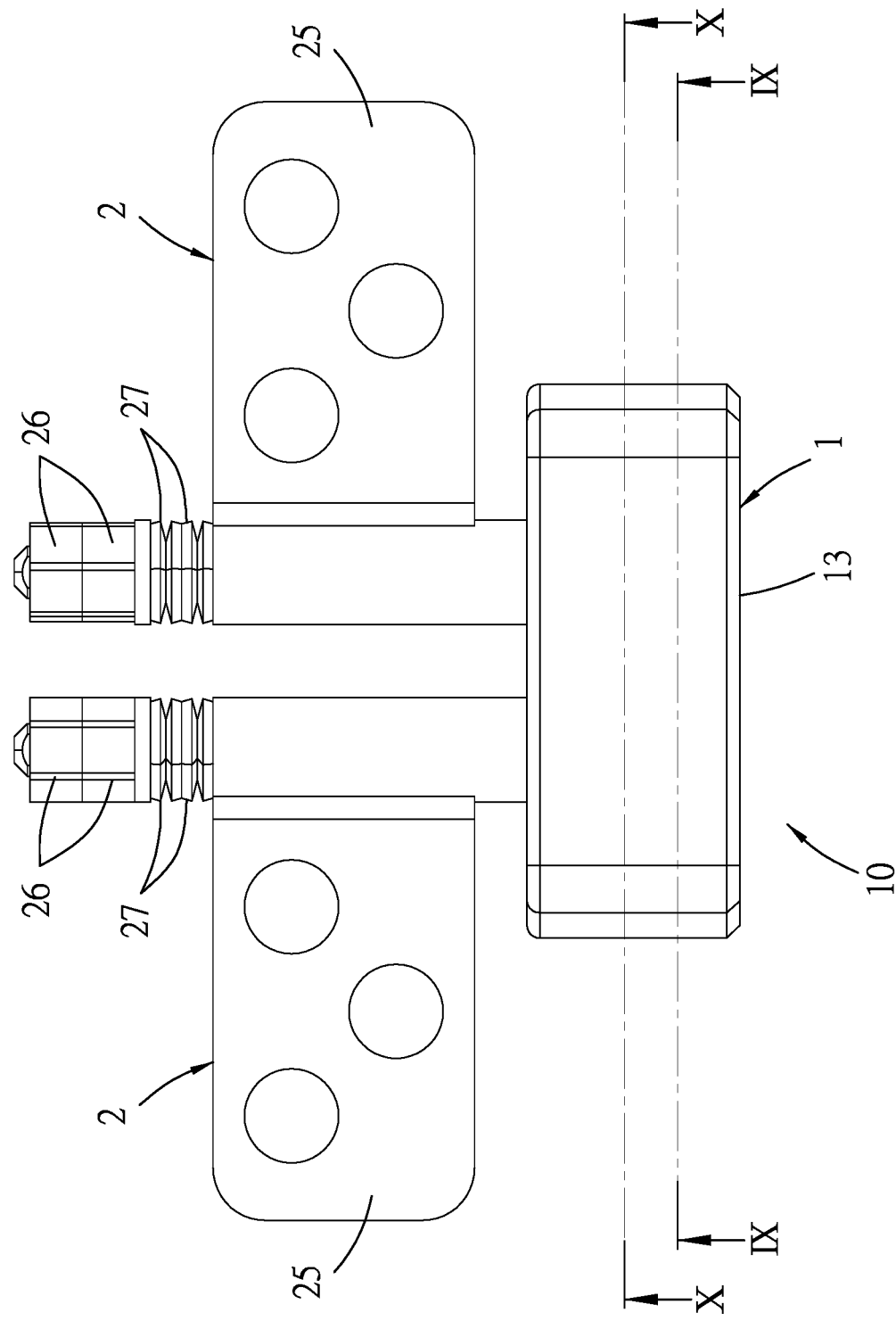
FIG. 8 is a top view of the embodiment.

Referring to FIGS. 4 and 8, the rotatable axle units 2 rotatably extend through the base seat 11. Each of the rotatable axle units 2 includes a hinge shaft 21 which extends in the axial direction and through a respective one of the shaft sliding slots 114 of the base seat 11 to have first and second shaft end portions 211, 214 that are respectively disposed at two opposite sides of the first major surface 111, a rotary member 22 which is non-rotatably fitted to the first shaft end portion 211 of the hinge shaft 21, a support bracket 25 which is non-rotatably fitted to the second shaft end portion 214 of the hinge shaft 21 and which extends outwardly and in the lateral direction to have a lateral end 251, a pair of frictional plates 23 which are sleeved on the hinge shaft 21 and interposed between the base seat 11 and the support bracket 25, and a pair of elastomeric pads 24 which are non-rotatably sleeved on the hinge shaft 21 and interposed between the base seat 11 and the support bracket 25. The hinge shaft 21 further has an abutting disc portion 212 and a sleeved portion 213 interposed between the first and second shaft end portions 211, 214 and adjoined with each other. The first shaft end portion 211 further extends in the respective auxiliary shaft slide slot (131b) of the protective cover 13. The frictional plates 23 and the elastomeric pads 24 are sleeved on the sleeved portion 213 to have one of the frictional plates 23 and the elastomeric pads 24 abutting against the abutting disc portion 212. The abutting disc portion 212 has a diameter larger than that of the sleeved portion 213. The diameter of the sleeved portion 213 is larger than that of the first and second shaft end portions 211, 214.

The rotary member 22 has a circular rotary body 221 and a protrusion 222 formed integrally with and extending radially and outwardly from the rotary body 221. Each hinge shaft 21 extends through and is engaged with a center of the rotary body 221. The rotary body 221 has a first toothed portion (221a) formed on a part of an outer periphery thereof, and a stabilizing block 224 extending in the axial direction toward the base seat 11 and the protective cover 13. On the protrusion 222, a guide key 223 is formed and extends in the axial direction toward the base seat 11 and the protective cover 13, and a second toothed portion (222a) is formed on a part of an outer periphery of the protrusion 222. The guide key 223 extends through the engaging hole 121 and is slidably engaged in the guideway 113 and the auxiliary guideway (131a). The stabilizing block 224 is movably engaged in the stabilizing slot 115 and the auxiliary stabilizing slot (131c). The two pairs of frictional plates 23 and the two pairs of elastomeric pads 24 are arranged alternately, and are sleeved on the sleeved portion 213 of the hinge shafts 21 and received in the accommodation chamber 116. With the frictional plates 23 and the elastomeric pads 24, a frictional force is generated between the support brackets 25 and the abutting disc portions 212 of the hinge shafts 21. Each elastomeric pad 24 has a pad body 241 and an arm portion 242 which is integrally connected with the pad body 241 and which is hollow. The arm portion 242 is formed with a fitted tip (242a) which is engaged in a respective one of the fit slots 117 to position the corresponding rotatable axle unit 2. Each support bracket 25 is securely connected to the second shaft end portion 214 of the hinge shaft 21 by means of two screw nuts 26 and a plural of washers 27. The washers 27 are in the form of disc springs to generate a positive force between the frictional plates 23 and the elastomeric pads 24 so as to stabilize the rotation of the hinge shaft 21. The lateral ends 251 of the support brackets 25 are connected with the casing parts 20 (see FIG. 1). In a modified embodiment, the guide key 223 and the stabilizing block 224 of each rotary member 22 may extend only toward the base seat 11 such that the auxiliary guideways (131a), the auxiliary shaft slide slots (131b) and the auxiliary stabilizing slots (131c) are dispensed with. Moreover, the number of the frictional plates 23 and the elastomeric pads 24 may be varied.

In this embodiment, the synchronizing member 12 is movably disposed to the upright segments (113a) of the guideways 113. Alternatively, the synchronizing member 12 may be disposed to be slidably attached to the first major surface 111 of the base seat 11, rather than engaging in the guideways 113. The synchronizing member 12 is provided to make synchronizing movements of the guide keys 223 in the upright segments (113a) of the guideways 113. Furthermore, the stabilizing slots 115 may extend from the middle of the shaft sliding slots 114, or may be not in communication with the shaft sliding slots 114.

Figure 9:
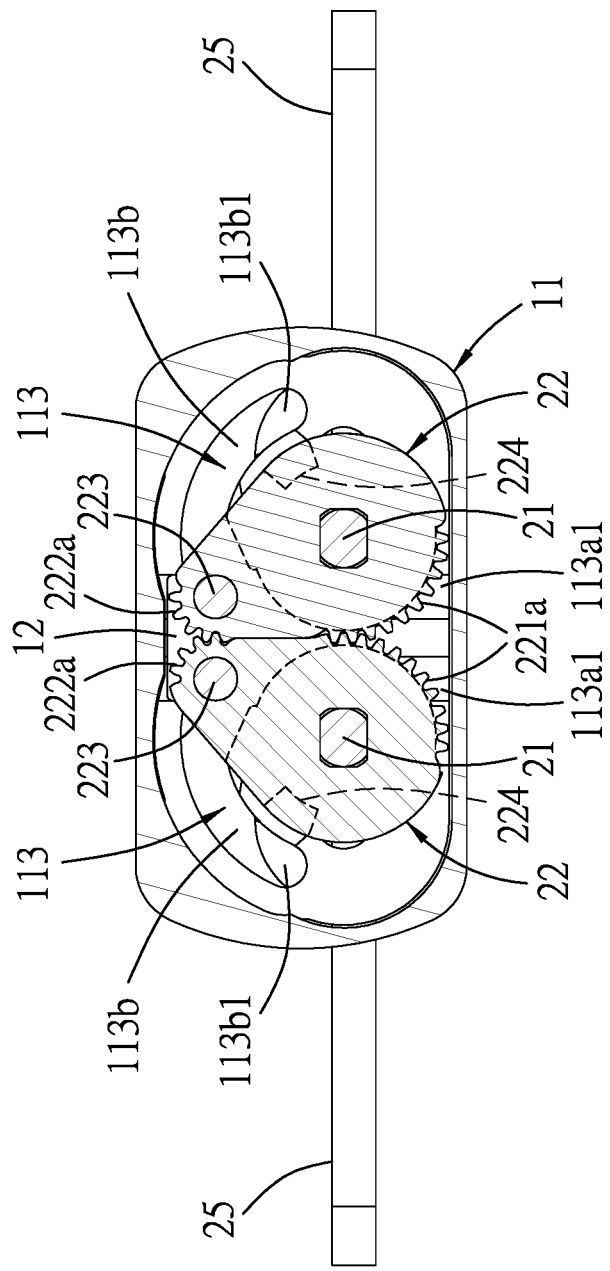
FIG. 9 is a sectional view taken along line IX-IX of FIG. 8, illustrating two rotatable axle units in a first stretched position.
Figure 11:
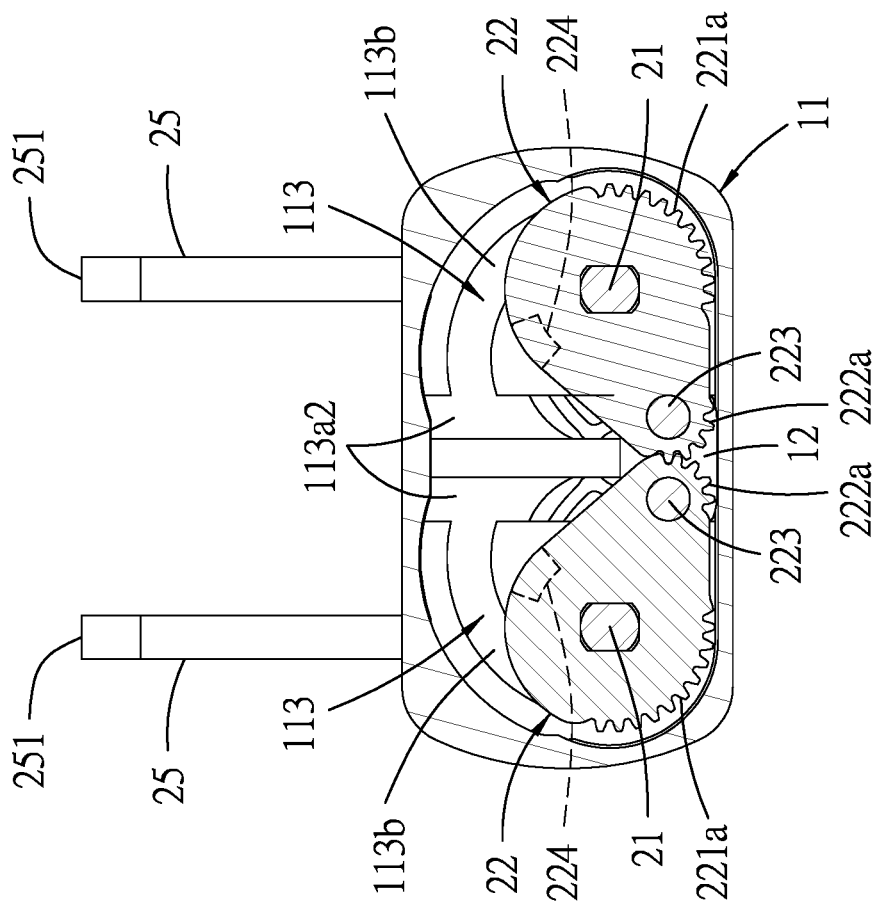
FIG. 11 is a sectional view similar to FIG. 9, illustrating the rotatable axle units in an initial position.
Figure 12:
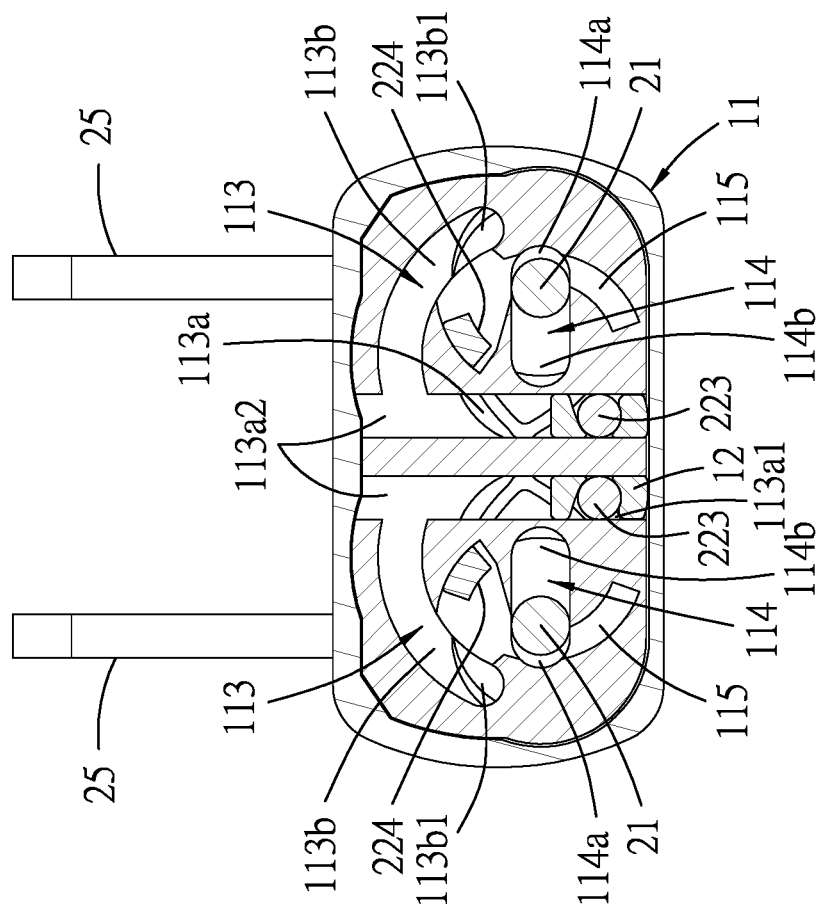
FIG. 12 is a sectional view similar to FIG. 10, illustrating the rotatable axle units in the initial position.
Figure 13:
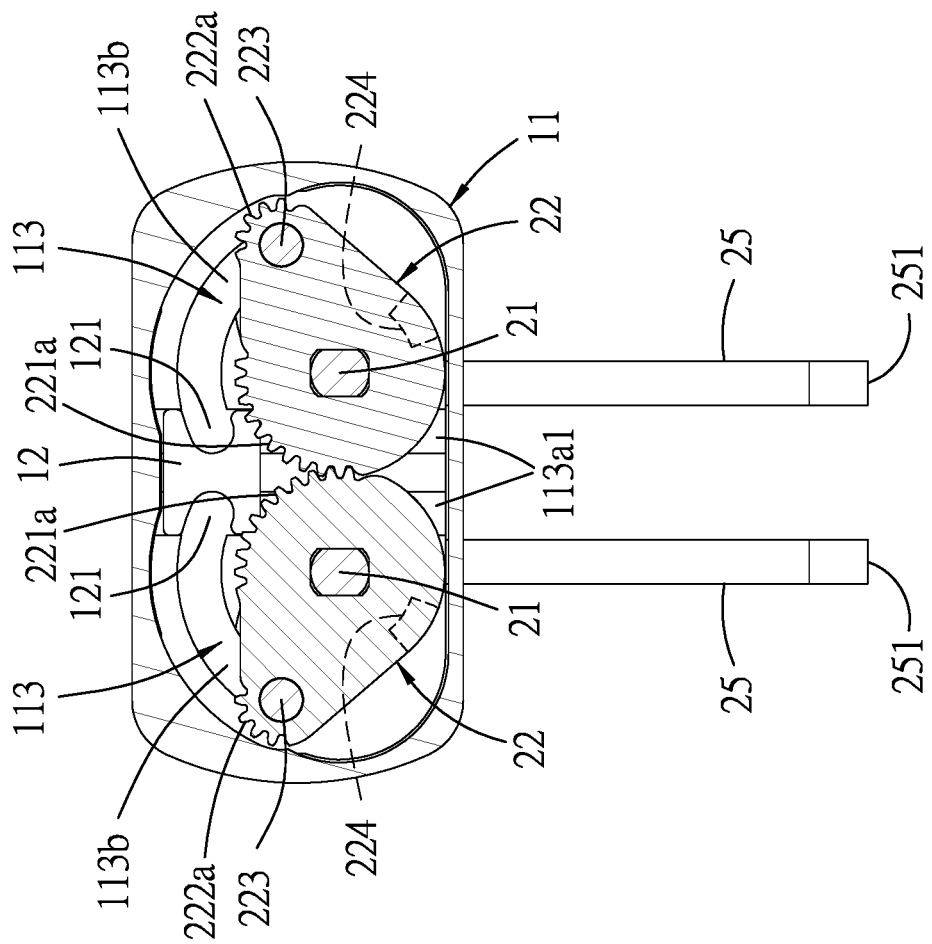
FIG. 13 is a sectional view similar to FIG. 9, illustrating the rotatable axle units in a second stretched position.

With reference to FIGS. 9, 11 and 13, the rotatable axle units 2 are rotatable relative to the base frame unit 1 among an initial position, a first stretched position and a second stretched position. Referring to FIGS. 2, 11 and 12, in the initial position, the support brackets 25 erect in the upright direction to bring the casing parts 20 into a closed state and the lateral ends 251 are close to each other to be respectively located above the hinge shafts 21, the guide keys 223 are respectively placed in the lower ends (113a1) of the guideways 113, and the hinge shafts are respectively placed in the outer ends (114a) of the shaft sliding slots 114.

With rotation of the rotatable axle units 2, the support brackets 25 and the connected casing parts 20 are turnable among the closed state, a first opened state (see FIG. 1) and a second opened state. When a user opens the foldable electronic device 30 for use, the rotatable axle units 2 are rotated such that the lateral ends 251 are remote from each other, the guide keys 223 are moved upwardly to the upper ends (113a2). With the synchronizing member 12 and the guideways 113, the synchronizing movements of the guide keys 223 are kept in the upright segment (113a) of the guideways 113. Meanwhile, the second toothed portions (222a) of the protrusions 222 mesh with each other when one of the guide keys 223 is moved in the corresponding upright segment (113a) so as to allow synchronous rotations of the rotary members 22 in opposite directions and to make the synchronizing movements of the guide keys 223 in the upright segments (113a) of the guideways 113 to the first stretched position. During this upward movement of the guide keys 223, since the distance between each hinge shaft 21 and the lower end (113a1) is smaller than that between the hinge shaft 21 and the upper end (113a2), the hinge shafts 21 are moved inwardly to the inner ends (114b) of the shaft sliding slots 114.

Figure 10:
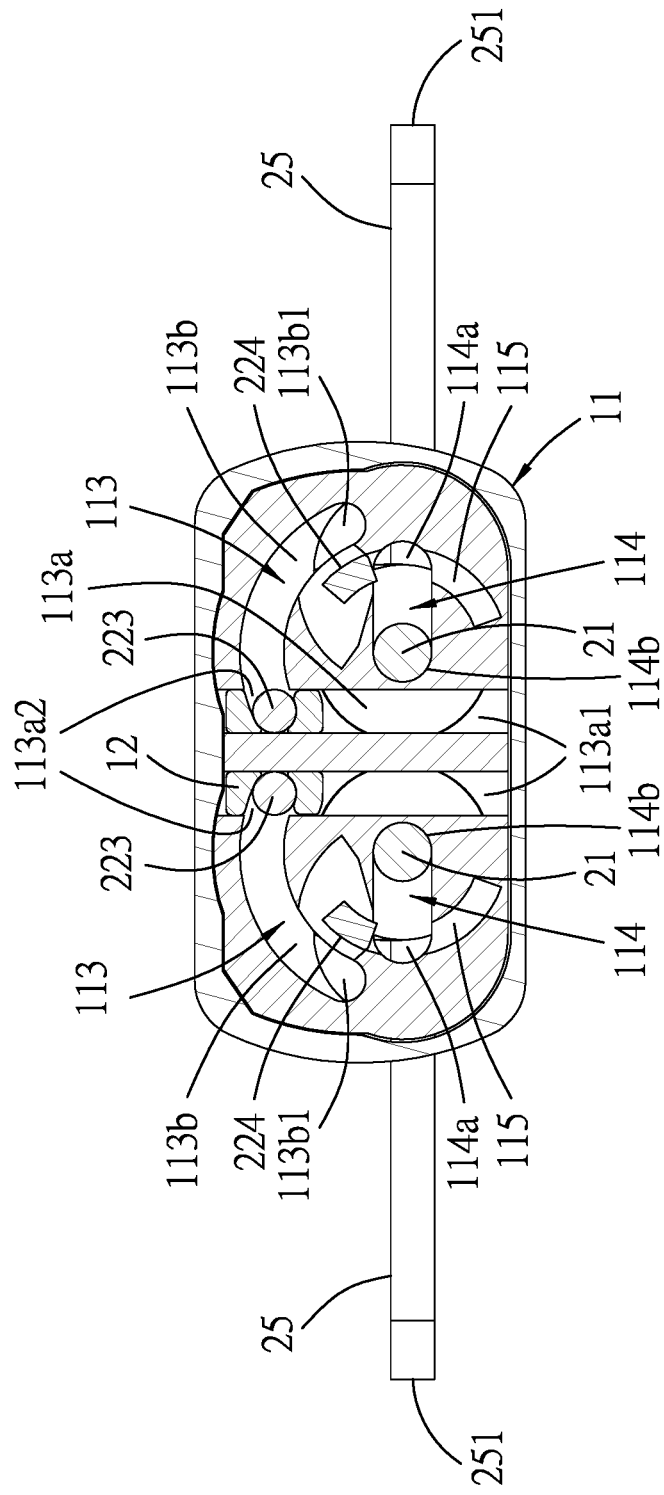
FIG. 10 is a sectional view taken along line X-X of FIG. 8, illustrating the rotatable axle units in the first stretched position.

Referring to FIGS. 1, 9 and 10, hence, in the first stretched position, the support brackets 25 are placed horizontally and in the lateral direction to bring the casing parts 20 into the first opened state, the guide keys 223 are respectively placed in the upper ends (113a2) of the guideways 113, and the hinge shafts 21 are respectively placed in the inner ends (114b) of the shaft sliding slots 114 to be closer to each other. Meanwhile, the fitted tips (242a) of the elastomeric pads 24 are engaged in the fit slots 117, respectively, to position the casing parts 20 in the first opened state. Through the upward movement of the guide keys 223 to the upper ends (113a2) to bring the hinge shafts 21 to the inner ends (114b), the distance between the casing parts 20 is decreased.

The rotatable axle units 2 can be further rotated such that the guide keys 223 are movable along the arcuate segments (113b) to the distal ends (113b1). During this movement, the first toothed portions (221a) of the rotary bodies 221 mesh with each other when one of the guide keys 223 is moved in the corresponding arcuate segment (113b) so as to allow synchronous rotations of the rotary members 22 in opposite directions and to make the synchronizing movement of the guide keys 223 in the arcuate segments (113b) of the guideways 113. Further, the stabilizing blocks 224 are movably engaged in the stabilizing slots 115, respectively, so as to restrict movement of the hinge shafts 21 relative to the shaft sliding slots 114 and hence keep the hinge shafts 21 unmoved between the casing parts 20.

Figure 14:
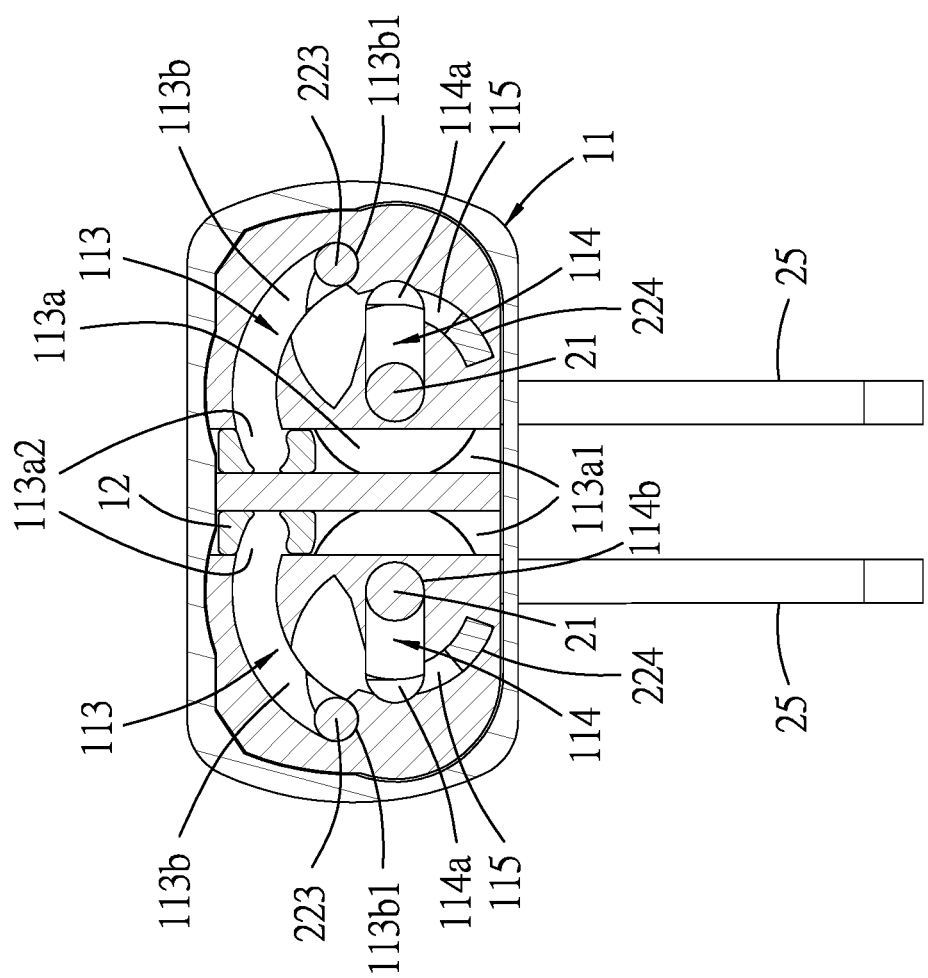
FIG. 14 is a sectional view similar to FIG. 10, illustrating the rotatable axle units in the second stretched position.

Referring to FIGS. 13 and 14, in the second stretched position, the support brackets 25 erect in the upright direction and the lateral ends 251 are close to each other to be respectively located below the hinge shafts 21 to bring the casing parts 20 into the second opened state, the guide keys 223 are respectively placed in the distal ends (113b1) of the guideways 113, and the hinge shafts 21 are respectively placed in the inner ends (114b) of the shaft sliding slots 114 to be closer to each other compared to the same in the initial position. The casing parts 20 are allowed to be turned from 0 to 360 degrees to each other.

As illustrated, with the rotatable axle units 2 rotatable among the initial position, the first stretched position and the second stretched position, the upward movement of the guide keys 223 to the upper ends (113a2) brings the hinge shafts 21 into movement to the inner ends (114b), which reduces the distance between the casing parts 20 in the first opened state.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A hinge comprising:
   a base frame unit including a base seat that has a first major surface to which an axial direction is normal, two guideways that are recessed from said first major surface and formed opposite to each other in a lateral direction which is transverse to the axial direction, and two shaft sliding slots each of which penetrates through said first major surface in the axial direction, each of said guideways including an upright segment which extends in an upright direction that is transverse to both the axial direction and the lateral direction and which has a lower end and an upper end, and an arcuate segment which extends arcuately and laterally from said upper end of said upright segment to terminate at a distal end, each of said shaft sliding slots extending in the lateral direction and having an inner end and an outer end, said inner ends of said shaft sliding slots being proximate to each other and said outer ends of said shaft sliding slots being distal from each other in the lateral direction; and
   two rotatable axle units rotatably extending through said base seat, each of said rotatable axle units including a hinge shaft which extends in the axial direction and through a respective one of said shaft sliding slots to have first and second shaft end portions that are respectively disposed at two opposite sides of said first major surface, a rotary member which is non-rotatably fitted to said first shaft end portion of said hinge shaft, and a support bracket which is non-rotatably fitted to said second shaft end portion of said hinge shaft and which extends outwardly and in the lateral direction to have a lateral end, said rotary member having a guide key which extends in the axial direction and which is slidably engaged in a respective one of said guideways;
   said rotatable axle units being rotatable relative to said base frame unit among an initial position, where said support brackets erect in the upright direction and said lateral ends are respectively located above said hinge shafts, said guide keys are respectively placed in said lower ends of said guideways, and said hinge shafts are respectively placed in said outer ends of said shaft sliding slots, a first extended position, where said support brackets are placed horizontally and in the lateral direction and said lateral ends are remote from each other, said guide keys are respectively placed in said upper ends of said guideways, and said hinge shafts are respectively placed in said inner ends of said shaft sliding slots to a second extended position, where said support brackets erect in the upright direction and said lateral ends are respectively located below said hinge shafts, said guide keys are respectively placed in said distal ends of said guideways, and said hinge shafts are respectively placed in said inner ends of said shaft sliding slots.

2. The hinge as claimed in claim 1, wherein said base frame unit further includes a synchronizing member which is mounted on and movable relative to said base seat in the upright direction, said synchronizing member having two engaging holes, said guide keys being respectively engaged in said engaging holes to make a synchronizing movement of said guide keys in said upright segments of said guideways.

3. The hinge as claimed in claim 1, wherein each of said rotary members has a circular rotary body and a protrusion extending radially and outwardly from said rotary body, each of said hinge shafts extending through and being engaged with a center of said rotary body, said guide keys being respectively formed on said protrusions, said rotary body having a first toothed portion formed on a part of an outer periphery thereof, said first toothed portions of said rotary bodies meshing with each other when one of said guide keys is moved in said corresponding arcuate segment so as to allow synchronous rotations of said rotary members in opposite directions and to make the synchronizing movement of said guide keys in said arcuate segments of said guideways.

4. The hinge as claimed in claim 3, wherein said protrusion of each of said rotary members has a second toothed portion formed on a part of an outer periphery thereof, said second toothed portions of said protrusions meshing with each other when one of said guide keys is moved in said corresponding upright segment so as to allow synchronous rotations of said rotary members in opposite directions and to make the synchronizing movement of said guide keys in said upright segments of said guideways.

5. The hinge as claimed in claim 3, wherein said base seat further has two stabilizing slots formed in said first major surface and extending angularly, said rotary body of each of said rotary members further having a stabilizing block which extends toward said first major surface and which is movably engaged in a respective one of said stabilizing slots when said guide keys are slidably engaged in said arcuate segments, respectively, so as to restrict movement of said hinge shafts relative to said shaft sliding slots.

6. The hinge as claimed in claim 5, wherein said base frame unit further includes a protective cover which is mounted on an outer peripheral surface of said base seat to cover and conceal said first major surface.

7. The hinge as claimed in claim 6, wherein said protective cover has a base wall facing said first major surface of said base seat in the axial direction, and a surrounding wall extending from a periphery of said base wall in the axial direction and mounted on said outer peripheral surface of said base seat, said base wall being formed with two auxiliary guideways which are configured to respectively mate and be aligned with said guideways in the axial direction, two auxiliary shaft slide slots which are configured to respectively mate and be aligned with said shaft sliding slots, and two auxiliary stabilizing slots which are configured to respectively mate and be aligned with said stabilizing slots, each of said guide keys further extending from said protrusion toward said protective cover and being slidably engaged in a respective one of said auxiliary guideways, said first shaft end portion of each of said hinge shafts further extending from said rotary body toward said protective cover and being movably engaged in a respective one of said auxiliary shaft slide slots, said rotary body of each of said rotary members further having an auxiliary stabilizing block which extends toward said protective cover and which is movably engaged in a respective one of said auxiliary stabilizing slots.

8. The hinge as claimed in claim 1, wherein said two rotatable axle units further include at least one pair of frictional plates which are respectively sleeved on said hinge shafts and each of which is interposed between said base seat and a respective one of said support brackets, and at least one pair of elastomeric pads which are respectively and non-rotatably sleeved on said hinge shafts and each of which is interposed between said base seat and a respective one of said support brackets.

9. The hinge as claimed in claim 8, wherein said base seat further has a second major surface opposite to said first major surface in the axial direction, an accommodation chamber which is recessed in said second major surface for accommodating said frictional plates and said elastomeric pads therein, and two fit slots which are formed in said accommodation chamber, each of said elastomeric pads having a pad body and an arm portion which is connected with said pad body and which is hollow, said arm portion being formed with a fitted tip which is engaged in a respective one of said fit slots.

10. The hinge as claimed in claim 8, wherein each of said hinge shafts further has an abutting disc portion and a sleeved portion which are interposed between said first and second shaft end portions and adjoined with each other, said frictional plates and said elastomeric pads being sleeved on said sleeved portions of said hinge shafts to have one pair of said frictional plates and said elastomeric pads abutting against said abutting disc portions of said hinge shafts.

* * * * *